US011970380B2

(12) United States Patent
Muszinski et al.

(10) Patent No.: US 11,970,380 B2
(45) Date of Patent: Apr. 30, 2024

(54) CONTAINER-HANDLING APPARATUS

(71) Applicant: KHS GMBH, Dortmund (DE)

(72) Inventors: Olaf Muszinski, Kelkheim (DE); Andreas Fahldieck, Idar-Oberstein (DE); Thomas Stolte, Bad Kreuznach (DE); Dominik Weirich, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 92 days.

(21) Appl. No.: 17/794,999

(22) PCT Filed: Jan. 28, 2021

(86) PCT No.: PCT/EP2021/051927
§ 371 (c)(1),
(2) Date: Jul. 25, 2022

(87) PCT Pub. No.: WO2021/160437
PCT Pub. Date: Aug. 19, 2021

(65) Prior Publication Data

US 2023/0081466 A1 Mar. 16, 2023

(30) Foreign Application Priority Data

Feb. 10, 2020 (DE) ..................... 10 2020 103 266.8

(51) Int. Cl.
*B67B 3/20* (2006.01)
*B21D 51/26* (2006.01)
(Continued)

(52) U.S. Cl.
CPC ........ *B67B 3/2033* (2013.01); *B21D 51/2692* (2013.01); *B65B 7/2842* (2013.01); *B67C 7/004* (2013.01)

(58) Field of Classification Search
CPC ..... B67B 3/2033; B67B 2201/08; B67B 3/28; B67B 3/00; B67B 3/12; B67B 3/2066
(Continued)

(56) References Cited

U.S. PATENT DOCUMENTS

| | | | | |
|---|---|---|---|---|
| 5,050,369 A | | 9/1991 | Fiwek et al. | |
| 5,335,474 A | * | 8/1994 | Ruetschi | B67B 3/06 53/367 |

(Continued)

FOREIGN PATENT DOCUMENTS

| | | | | |
|---|---|---|---|---|
| DE | 1964369 A1 | | 7/1971 | |
| DE | 2158961 A1 | * | 5/1973 | B67B 3/20 |

(Continued)

*Primary Examiner* — Jacob A Smith
(74) *Attorney, Agent, or Firm* — Laurence A. Greenberg; Werner H. Stemer; Ralph E. Locher

(57) ABSTRACT

A container-handling apparatus, in particular a closing machine for closing cans or similar containers with a closure cap. A transfer element is provided between at least two adjacent container-closing positions. The transfer element surrounds at least part of the circumference of the respective container carrier and is provided so as to rotate with, i.e., revolve with, the container-closing positions. Furthermore, the upper side of the transfer element forms a transfer plane for transferring the upright containers in a planar manner from the transport plane onto the transfer plane spanned by the transfer element. The transfer plane and the transport plane are coplanar, spanning a common plane.

24 Claims, 4 Drawing Sheets

(51) Int. Cl.
*B65B 7/28* (2006.01)
*B67C 7/00* (2006.01)

(58) Field of Classification Search
USPC ........................ 53/167, 281, 471, 317, 331.5
See application file for complete search history.

(56) References Cited

U.S. PATENT DOCUMENTS

| | | | |
|---|---|---|---|
| 10,899,554 | B2 | 1/2021 | Fahldieck et al. |
| 11,059,710 | B2 | 7/2021 | Naaber |

FOREIGN PATENT DOCUMENTS

| | | | | | |
|---|---|---|---|---|---|
| DE | 2158961 | A1 | | 5/1973 | |
| DE | 8916109 | U1 | | 10/1993 | |
| DE | 102015121433 | A1 | | 6/2017 | |
| DE | 102017112218 | B3 | | 8/2018 | |
| DE | 102017105509 | A1 | * | 9/2018 | ............... B67B 3/02 |
| DE | 102017105509 | A1 | | 9/2018 | |
| EP | 0382161 | A1 | | 8/1990 | |
| EP | 0544617 | A1 | | 6/1993 | |
| EP | 1205430 | A1 | | 5/2002 | |
| JP | 2010155636 | A | | 7/2010 | |
| WO | 2010118806 | A2 | | 10/2010 | |
| WO | 2018166690 | A1 | | 9/2018 | |
| WO | 2018219523 | A1 | | 12/2018 | |

* cited by examiner

CONTAINER-HANDLING APPARATUS

FIELD AND BACKGROUND OF THE INVENTION

The invention relates to a container-handling apparatus, in particular a closing machine for closing cans or similar containers with a closure cap. The present invention further relates to a corresponding method for closing cans or similar containers with a closure cap.

Container-handling apparatus, in particular closing machines for closing cans or similar containers with a closure cap are known to the person skilled in the art in the most widely differing designs. In this situation, the present invention relates in particular to container-handling machines in the beverage industry, which preferably have a capacity of more than 10000 containers per hour, and for particular preference a capacity of 50000 containers per hour.

Such closing machines are used, for example, in beverage filling systems, and, as a rule, are arranged in the immediate spatial vicinity of a corresponding filling station or filling machine, and in direct connection with them, such that the freshly filled containers can be closed immediately after filling with liquid filling product.

In particular, such container-handling apparatus units of circulating configuration are known, with which a plurality of container closing positions are formed at the circumference of a rotor which is driven such as to circulate about a vertical machine axis or middle axis. In this situation, a punch device is assigned to each container closing position, which is also to be understood as a closing tool or closing punch. Such container-handling apparatus units are also designated as circulating machines.

In this situation, the closing elements or closing tools of such closing apparatus can be moved along a vertical closing element axis by means of a raising and/or lowering movement, axially between a raised and lowered position, wherein this axial raising movement is also understood to be an adjustment raising movement. This adjustment raising movement is usually produced by lifting cams, which are provided so as to control the height of the closing elements.

Examples of such closing machines with lifting-cam controlled closing elements are known from DE 10 2017 112 218 B3 or from WO 2010/118806 A2.

It is possible for a plurality of transport elements to be provided along such container-handling apparatus of circulating configuration (circulating machines), in each case driven such as to rotate about a vertical machine axis, which are connected to one another such as to be capable of transport, and form container-handling segments, such that a container, in particular a can, is conveyed by forwarding from one transport element, driven such as to circulate, to another transport element connecting to it in the transport direction, along a container-handling segment with a plurality of directional deflections.

In this situation, provision can also be made for the adjacent transport elements of such a container-handling apparatus to be linear conveying transport elements, as well as an adjacent transport element conveying the containers in a rotating circulating manner. Such transport elements are also realised in a closing machine of circulating configuration. In particular, the containers of a closing machine, which are already filled with liquid filling product but are not yet closed, are conveyed onwards from one linear conveyor onto a circulating rotor, at the circumference of which the container closing positions are formed.

With the transport elements formed as a linear conveyor, the containers are transported essentially in a straight line, and essentially also without a change in their positional height.

At the onward conveying of the containers, in particular inside the closing machine, from one transport element to a transport element following in the direction of treatment, there are frequently changes in the curvature of the movement path of the containers, and therefore to a change in the centripetal acceleration taking effect on the containers. With a high container throughput (number of the cans conveyed per time unit), the respective container undergoes a transverse jolt, caused by powerful acceleration forces, which can lead to the overspilling of the filling product out of the mouth of the can.

In this situation, in the prior art, the still open cans are transferred in linear fashion, in particular exclusively in a straight line directly to a container carrier of a container closing position, to a closing machine, and specifically already approximately at a linear speed which corresponds in its value to the circumferential speed of the mid-point of the container carriers of the closing machine.

Since high-capacity can closing machines, which as a rule exhibit a diameter of approx. 1000 mm. circulate at a revolution speed of up to 110 revolutions per minute, considerable centripetal acceleration values are required, since the cans, which at this point in time are not yet gas-tight or fluid-tight, follow the circulatory movements of the can closing device.

These high centripetal acceleration values lead, in particular with cans with a large diameter and a correspondingly large free fluid level, and/or with cans with a small head space, to an overspill of the filling product. This overspill leads to a substantial loss of the filling product and to substantial contamination, which in practice is extremely undesirable.

SUMMARY OF THE INVENTION

Taking this as a basis, the object of the invention is to provide a container-handling apparatus, in particular a closing machine, for closing cans or similar containers with a closure cap, which allow for a transfer of the containers, as far as possible free of any jolts, from the transporter to the container closing position located downstream in the transport direction.

This object is solved by a container-handling apparatus, in particular a closing machine for closing cans or similar containers with a closing cap, in accordance with the features as claimed. The dependent claims relate to particular advantageous further embodiments of the invention.

According to a first aspect, the invention relates to a container-handling apparatus, in particular a closing device for closing cans or similar containers with a closure cap along a container-handling segment running in a handling direction.

In this situation, the container-handling apparatus comprises at least one first transporter and a rotor downstream along the container-handling segment in the handling direction, at the circumference of which are formed a plurality of container closing stations for closing the containers in each case with a closure cap provided from a closure cap conveyor. In this situation the rotor is arranged such that it circulates about a central column, extending along a vertical machine axis and fixed in position.

Furthermore, the first transporter is configured as a linear conveyor, by means of which the containers, not yet closed and with their container bases standing upright on a transport plane, can be conveyed or are conveyed in the handling direction. The containers are then further transferred from the first transporter onwards to a corresponding container closing position of the rotor, which is being driven by a motor around the central column.

In this situation, the container closing stations circulating around the central column in each case comprise at least one punch device, arranged at the rotor and moving downwards and upwards, as well as a container carrier provided beneath the punch device. The container carrier in turn can be moved in a rotational and lifting movement on a carrier ring, which can be driven by a motor such as to circulate around the central column beneath the rotor.

According to the invention, in this situation at least one transfer element, surrounding at least part of the circumference of the respective container carrier, is provided between at least two adjacent container closing stations, which is provided such as to rotate, i.e. circulate, together with the container closing station. The transfer element further forms on its upper side a transfer plane for transferring the upright containers in a planar manner from the transport plane onto the transfer plane spanned by the transfer element, by the transfer plane spanning a common plane with the transport plane.

According to one advantageous embodiment variant, provision can be made in this situation for the at least one transfer element to be provided such as to rotate in synchrony with the container closing stations.

According to a further advantageous embodiment variant, provision can be made in this situation for an at least partially closed transport surface to be formed between the first transporter and the at least one transfer element, on which the containers can be transferred steplessly with their respective container bases from the first transporter onto the transfer element, and from there onto the height-adjustable container carrier.

According to a further advantageous embodiment variant, provision can be made in this situation for the at least one transfer element to be configured as a transfer plate.

According to a further advantageous embodiment variant, provision can be made in this situation for the at least one transfer element to be arranged on the transfer ring in a fixed but detachable manner.

According to a further advantageous embodiment variant, provision can be made in this situation for the at least one transfer element to form a planar surface on its upper side, which spans the transfer plane, and exhibits such low friction coefficients that the containers can be transferred with their respective containers bases sliding on the transfer element.

According to a further advantageous embodiment variant, provision can be made in this situation for the at least one transfer element to exhibit edges which are chamfered on at least part of their circumference, on the free peripheral region of the surface.

According to a further advantageous embodiment variant, provision can be made in this situation for a transfer element to be provided between at least two adjacent container closing stations, enclosing the respective container carrier in its full circumference in the region of its contact surface.

According to a further advantageous embodiment variant, provision can be made in this situation for thrust elements to be provided between all the container closing stations.

According to a further advantageous embodiment variant, provision can be made in this situation for a transfer curve segment, formed by guide rails, to be formed between the first transporter and the transfer of the containers to the respective container closing station and configured as a clothoid segment and/or Bloss curve segment, the course of which is selected in the shape of a clothoid or of a Bloss curve respectively. It is also possible to make use of polynomes and/or trigonometric curves, with a similar course for the transfer curve segment.

According to a further advantageous embodiment variant, provision can be made in this situation for the closure cap conveyor to be configured for the individual delivery of the closure caps still before the transfer of a corresponding container to the assigned container closing station.

According to a further advantageous embodiment variant, provision can be made in this situation that, above the movement path of the containers along the container handling segment, and in particular at least above the transfer curve segment, at least one counter-pressing element is provided, which presses against the closure cap placed onto the container by the closure cap conveyor.

According to a further advantageous embodiment variant, provision can be made in this situation for the at least one counter-pressing element to be configured in such a way as to press the respective closure cap at its free peripheral regions.

According to a further advantageous embodiment variant, provision can be made in this situation for the at least one counter-pressing element to be configured as a counter-pressing strip, which exhibits slide surfaces on its respective underside facing towards the closure caps.

According to a further advantageous embodiment variant, provision can be made in this situation for the at least one counter-pressing element to be arranged in a fixed position on the closing machine.

According to a further aspect, the present invention relates to a method for closing cans or similar containers with a closure cap by means of a closing machine of circulating design, with which the respective container is produced by the positive-fit connection of the closing cap to the container by mutual pressing, in that, for the closing movement, the container is raised by means of a container carrier and/or a punch device is lowered onto the container together with the closure cap placed on it.

The method is characterised in particular by the fact that the closure cap is placed onto the container and at least partially pressed onto it still before the container is transferred with its respective container base completely onto the container closing station.

According to one advantageous embodiment variant, provision can be made in this situation for the closure cap to be pressed at least partially by means of the at least one counter-pressing element.

According to a further advantageous embodiment variant, provision can be made in this situation for the closure cap to be at least partially pressed onto the container before the respective container is transferred, with a maximum of 50%, preferably with less than 25%, of its container base surface onto the respective container carrier of a corresponding container closing station. Particularly advantageously, the closure cap is pressed at least partially onto the container at a point of time before the respective container has been transferred with a maximum of 50%, preferably with less than 25%, of its container base surface onto the respective container carrier of a corresponding container closing station. Particularly advantageously, the closure cap is at least partially pressed onto the container at a point of time at which the container, including the closure cap placed on it, is still located completely with its container base on the transporter arranged in the handling direction upstream of the corresponding container closing station.

According to a further advantageous embodiment variant, provision can be made in this situation for the pressing together of the closure cap and the container to be maintained by means of the counter-pressing element preferably for as long as until an assigned punch device is lowered onto the closure cap in a corresponding container handling station, and finally the respective closure cap is pressed together with the container.

The term “clothoid” in the meaning of the invention is understood to be a curve of which the curvature constantly increases in linear fashion. In this situation, the product of the curve radius and arc length forms a constant. In other words, at each point on the curve the curvature is proportional to the length of its arc up until this point.

The term “container” in the meaning of the invention is understood to be any container, in particular bottles, cans, beakers, etc., in each case made of metal, glass, and/or plastic, preferably of PET (polyethylene terephthalate).

The expression “essentially” or “approximately” signifies in the meaning of the invention deviations from the respective exact value by +/−10%, preferably by +/−5%, and/or deviations in the form of changes which are not of significance for the function.

Further embodiments, advantages, and possible applications of the invention are also derived from the following description of exemplary embodiments and from the Figures. In this situation, all the features described and/or represented as images are in principle the object of the invention, individually or in any desired combination, regardless of their representation in the claims or reference to them. The contents of the claims are also made a constituent part of the description.

BRIEF DESCRIPTION OF THE FIGURES

The invention is explained in greater detail hereinafter on the basis of the Figures showing exemplary embodiments. The Figures show.

Identical reference numbers are used in the Figures for elements which are the same or have the same effect. In addition, for the sake of easier overview, only reference numbers are represented in the individual Figures which are required for the description of the respective Figure. The invention is also represented in the Figures only in a schematic view in order to explain the mode of operation. In particular, the representations of the Figures serve only to explain the basic principle of the invention. For reasons of easier overview, not all the constituent parts of the closing machine have been represented.

DETAILED DESCRIPTION OF THE INVENTION

Figure 1:
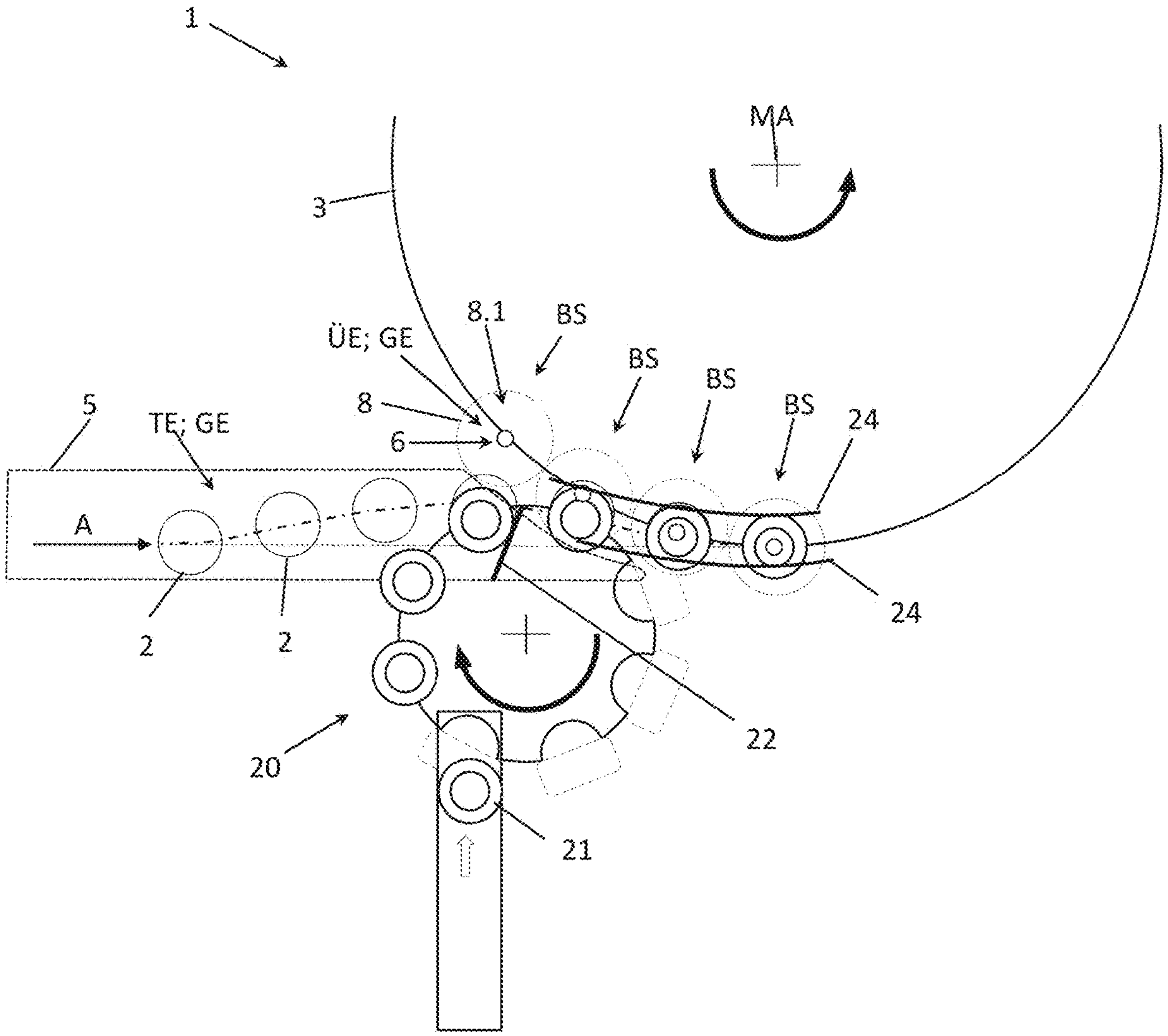
FIG. 1 By way of example and in a schematic view from above, an embodiment variant of a partially represented closing machine according to the invention for closing cans or similar containers with a closure cap.

The container-handling apparatus, designated in FIG. 1 in general by 1, is in this situation configured as a closing machine for closing cans or similar containers 2 with a closure cap 21, running along a container handling segment BR in a handling direction A.

Represented in FIG. 1, only by way of example, is a special embodiment of a closing machine 1 according to the invention, wherein, for reasons of easier overview, only a few components of the entire closing machine 1 are explicitly explained, namely components which are relevant for the description of the present invention, and for this purpose are provided with reference numbers in FIG. 1. In this case, for reasons of easier overview, no more precise details are given of other additional components and elements of the closing machine 1 which are not of particular significance in connection with the invention.

Usually, arranged upstream of such a closing machine 1, in a handling direction A of the container handling segment BR, is a filling machine, not represented in greater detail in the Figures, for filling the containers 2 with a fluid filling product and provided in spatial proximity. The containers 2, filled by means of the filling machine, are then conveyed by means of transport devices, such as transport belts, to the closing machine 1, and there are taken over by a first transporter 5, which is or can be a part or component of the closing machine 1.

In this situation the first transporter 5 is configured as a linear conveyor, by means of which the containers 2, still not closed, i.e. open at the top, and standing upright with their container bases 2.1 on a transport plane TE, can be conveyed along the container handling segment BR in the handling direction A. The first transporter 5 is therefore configured such as to transport or convey the containers 2, standing upright with their container bases 2.1 on the transport plane TE in a handling direction A. For example, the first transporter 5 can be formed as an endless conveyor, in particular as a mat conveyor, a flat top conveyor, or also as a chain conveyor.

In this situation, the containers 2 are transferred from the first transporter 5 to a corresponding container closing station BS of the closing machine 1, which is driven by a motor such as to circulate about the central column 4. After running through the container closing stations BS of the closing machine 1, i.e. after the closing of the individual containers 2 with a closing cap 21 in each case, in a manner described in greater detail hereinafter, the containers 2 which are then closed in such a way are taken over by another transfer element, not represented and provided downstream in the transport direction A, onto the closing machine 1, for example an outlet star, and are transported away in a manner known to the person skilled in the art.

In this situation, the transport element downstream of the closing machine 1 can be configured as a part or component of the container handling segment BR. In all cases, the container handling segment BR is formed by the first transporter 5 and the rotor 3, downstream in the handling direction A.

Figure 2:
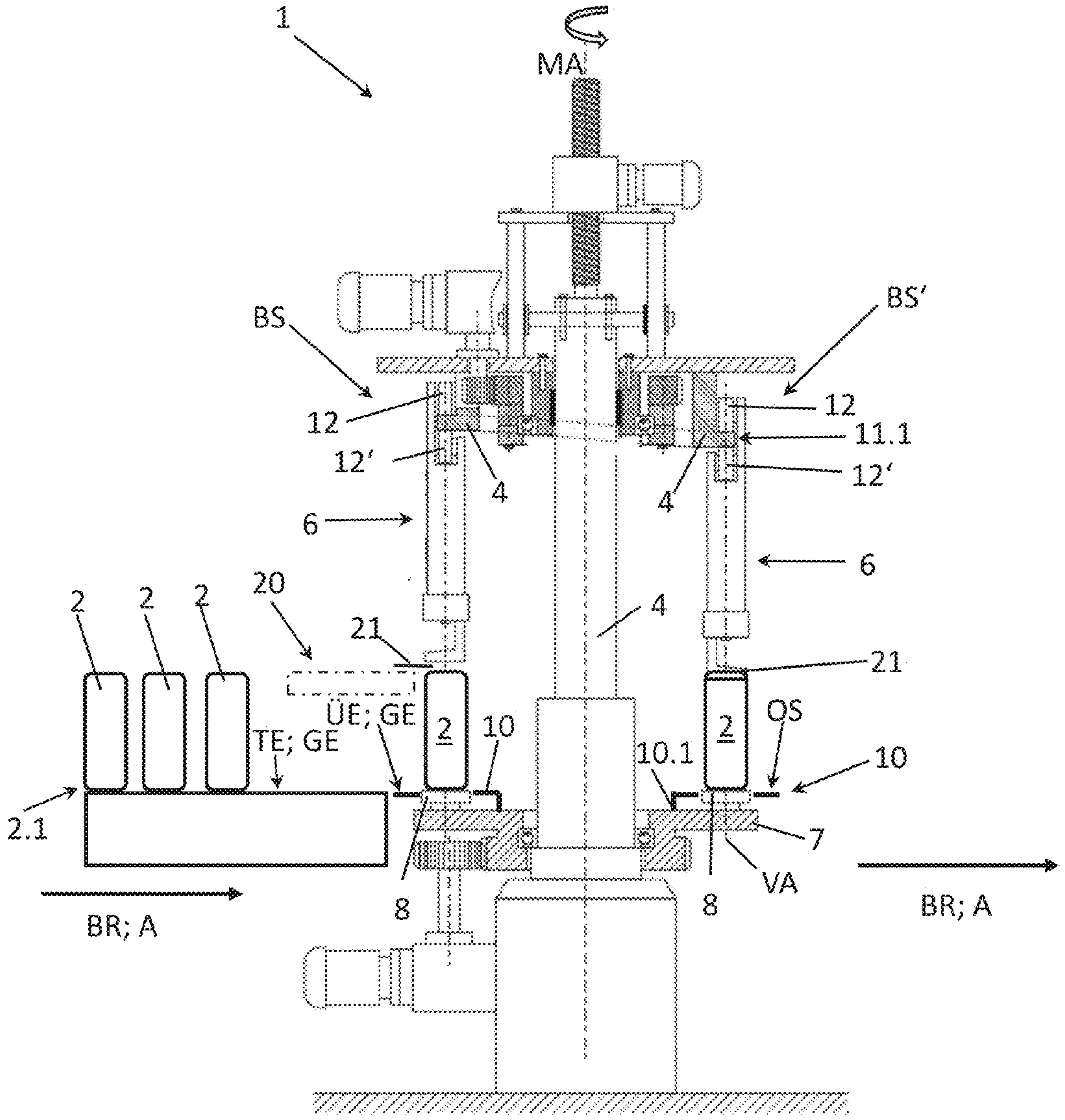
FIG. 2 by way of example and in a rough schematic side view, an embodiment variant of a closing machine for closing cans or similar containers with a closure cap.
Figure 3:
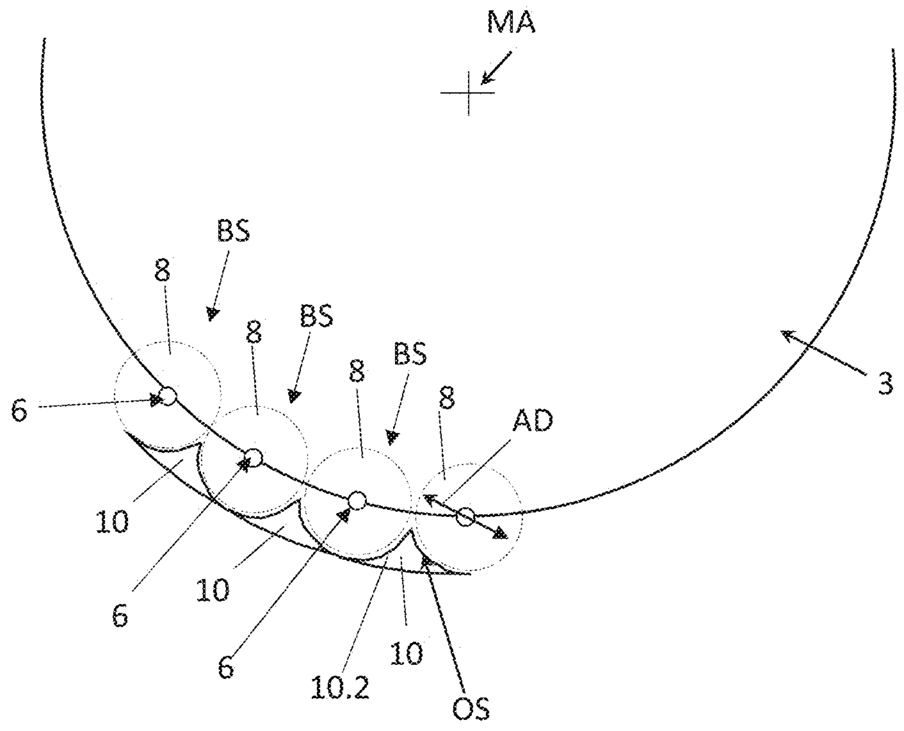
FIG. 3 by way of example and in a schematic view from above, the transfer elements on a closing machine, provided between the container closing stations.

In greater detail, the closing apparatus 1 comprises the fixed position central column 4, extending along a vertical middle axis MA, provided at which is at least one rotor 3, which can be driven by a motor such as to circulate, and which, driven by a motor, rotates circulating in a direction of rotation indicated by the rounded arrow. In this situation, formed or arranged at the circumference of the rotor 3 are a plurality of container closing stations BS, BS', of which, for the sake of easier overview, only two are represented in FIG. 2.

The plurality of container closing stations BS are in this situation configured for closing the containers 2 in each case with a closure cap 21, provided by a closure cap delivery conveyor 20. The closure cap delivery conveyor 20 can in this situation be configured in particular as a star wheel conveyor, for individual delivery of the respective closure cap 21 still during the transport of the container 2 on the first transporter 5. In particular, the closure cap delivery conveyor 20 is configured for the individual delivery of the closure caps 21 still before the respective transfer of a corresponding container 2 to the container handling station BS. In order to transfer the closure cap 21 onto the still open can 2, the closure cap delivery conveyor 20 can comprise a transfer device 22 for the closure cap 21, which can be configured, for example, as a run-on wedge or actively driven transfer element.

In this situation, the container closing stations BS, rotating around the central column 4, i.e. rotating together, in each case comprise at least one punch device 6, arranged at the rotor and movable downwards and upwards, as well as a container carrier 8, provided in each case beneath the punch device 6. The respective container carrier 8 is in turn provided or arranged at a carrier ring 7, which can be driven by a motor such as to circulate around the central column 4.

Each container closing station BS, BS', comprises in each case a punch device 6, which can be moved downwards and upwards, preferably in a controlled manner, as well as a container carrier 8, which can rotate around a corresponding closing element axis VA, and can be moved upwards along the closing element axis VA, i.e. in particular can be moved up and down along the closing element axis VA. The punch device 6 can in this situation extend, depending on its length, along a respective vertically oriented closing element axis VA. When circulating around the rotor 3, the punch devices 6 can be raised, by means of a controlled raising and/or lowering movement, axially between a raised and a lowered position, namely up and down in a vertical direction.

For the closing movement, i.e. the counter-pressing of the container 2 and closure cap 21, it is possible, for example, for only the container 2 to be raised by means of the container carrier 8. As an alternative, the container 2 can be raised by the container carrier 8, and, in addition, the punch device 6 can be lowered, at the same time or with a time delay. Finally, the container 2 can also be held in a fixed position on the container carrier 8, and only the punch device 6 is lowered.

The punch device 6 of the container closing station BS, represented in FIG. 2, adopts the raised position, and that of the container closing station BS', represented in FIG. 1, is located in the lowered position. The axial raising movement is also understood to be an adjustment raising movement, and forms a height control for the punch device 6.

For the height control, i.e. controlling the raising and/or lowering of the punch devices 6, a lifting cam 11 can be provided, for example, by means of which the punch device 6 can be force-guided such as to circulate around the middle axis MA. For this purpose, the punch devices 6, configured as closing elements, are provided on their upper side, namely at their upper end, with a running roller 12, which runs guided on a guide surface of the lifting cam 11, and specifically force-guided by mechanical means between two guide surfaces. The running roller 12 therefore interacts, by way of its running surface, with the guide surfaces of the lifting cam 11.

The axial raising and/or lowering of the punch devices 6 along the closing element axis VA for its height control takes place during the circulating of the punch devices 6 about the middle axis MA, due to the force-guiding between the running rollers 12, 12', in the raising cam 11, and can therefore be formed, in this exemplary embodiment variant, as a raising cam-controlled height adjustment or as a raising cam height control arrangement.

The raising cam 11 of the exemplary closing device 1 exhibits an essentially L-shaped cross-section, with a horizontal and a vertical limb, wherein the horizontally-oriented limb forms or provides the guide surface. Over the circumference of the raising cam 11, the vertical extension varies, in particular the length of the vertical limb, which, with the container closing station BS represented, exhibits the shortest length, and with the container closing station BS', exhibits the greatest length. An outer circumference 11.1 of the raising cam 11 is defined by the approximately vertically oriented face surface of the horizontally oriented limb, which also forms the outer circumferential surface, in particular located radially on the outside, and therefore determines the outer diameter of the raising cam 11.

Figure 4:
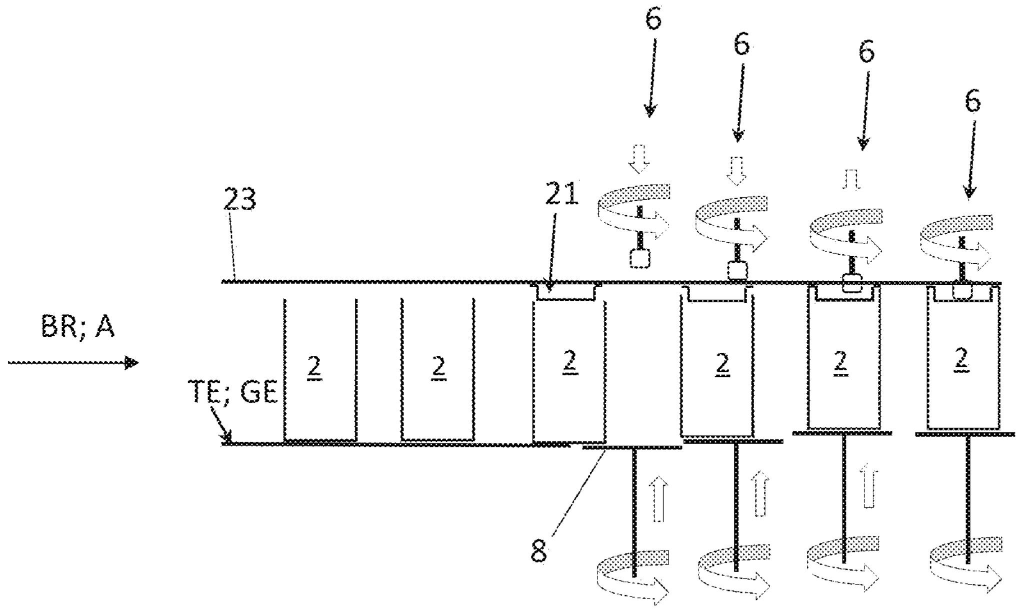
FIG. 4 by way of example and as a schematic block circuit diagram, in different closing phases, a raising movement container carrier with a closure cap set on the can.

Arranged beneath the respective punch device 6 is the container carrier 8, which is preferably capable of rotational movement around the closing element axis VA as well as raising movement along the closing element axis VA, i.e. it can be moved upwards and downwards in particular along the closing element axis VA, provided or arranged at which is the carrier ring 7, which can be driven by a motor so as to circulate around the central column 4, as is represented in greater detail in FIG. 4.

The container carrier 8 is preferably formed with its contact surface 8.1 for the containers 2 as rotationally symmetrical to the closing element axis VA. Further advantageously, the contact surface 8.1 of the respective container carrier 8 exhibits an outer diameter AD, which is configured as larger than the outer diameter of the container 2 standing upright, in particular of its associated container base 2.1.

According to the invention, in this situation a transfer element 10 is provided between at least two adjacent container closing stations BA, which encloses the respective container carrier 8 over at least a part of its circumference. The at least one transfer element 10 is in this situation provided such as to rotate with the container closing stations BS, in particular rotating in synchrony. In particular, the at least one transfer element 10 is therefore configured as rotating around the central column 4 as well as rotating in synchrony with the rotor 3.

The at least one transfer element 10 forms on or with its upper side OS a transfer plane ÜE for planar transfer of the upright containers 2 from the transport plane TE onto the transfer plane ÜE, spanned by the at least one transfer element 10, in that the transfer plane ÜE forms or spans, with the transport plane TE, a common plane GE. Accordingly, a closed, i.e. continuous, transport surface is formed between the first transporter 5 and the at least one transfer element 10, on which the containers 2, with their respective container bases 2.1, can be transferred onto the transfer element 10, and from there can be transferred steplessly onto the height-adjustable container carrier 8. In particular, the container carrier 8, which can be moved in a rising direction, is located, at the point of time of the transfer of the containers 2, with its contact surface 2.1 likewise in the common plane GE.

Preferably, the at least one transfer element 10 can be configured as a transfer plate, and arranged by means of a securing arm 10.1 on the carrier ring 7. The securing arm 10.1 can extend in its longitudinal extension, for example, perpendicular or approximately perpendicular to the transfer plane ÜE, in the direction of the carrier ring 7.

According to one advantageous embodiment variant, the at least one transfer element 10 is arranged, secured but detachable, on the carrier ring 7. In a further embodiment variant, the transfer element 10 can be configured as of one piece with the carrier ring 7.

In particular, the at least one transfer element 10 forms on its upper side OS a planar, i.e. flat, surface 10.2, which spans the transfer plane ÜE. In this situation, the transfer plane ÜE intersects the vertical machine axis MA preferably perpendicular or approximately perpendicular.

Advantageously, the surface 10.2 exhibits a low friction coefficient, such that the containers 2, with their respective container bases 2.1, can be transferred easily and smoothly on the transfer element 10.

Further advantageously, provision can be made for the at least one transfer element 10 to comprise chamfered edges at the free ends of the surface 10.2, i.e. in the region of the outer circumference of the surface 10.2, which further simplifies the transfer of the containers 2 onto the transfer element 10.

Further advantageously, a transfer element 10 can be provided between at least two adjacent container closing stations BS, which entirely surrounds the respective container carrier 8 in the region of its contact surface 8.1. The openings provided in the at least one transfer element 10, for the adjacent container carriers 8, exhibit in this situation an inner diameter, which is configured as slightly larger than the outer geometry of the container carriers 8.

Particularly advantageously, transfer elements 10 are provided between all the container closing stations BS.

In order to transfer the containers 2 from the first transporter 5 onto the container carrier 8, provision can be made in this situation for guide rails, as side guides, not represented in any greater detail in the Figures. By means of the guide rails, the containers 2 are guided during their transport at least along this transfer curve segment, which extends between the first transporter 5 and the respective container carrier 8, in a channel which is delimited by guide rails on both sides. In greater detail, the channel is formed between the outer guide rail, which is not circumferential, and an inner circumferential guide rail, in which channel the containers 2 are guided at least along the transfer curve segment of the container handling segment BR. Preferably, the containers 2 are guided by means of the guide rails centrically onto the container carriers 8, as well as centrically beneath the raised punch device 6 of an assigned container handling station BS.

Furthermore, the guide rails can be configured in such a way that they prevent the tipping of the containers 2 when being transferred on the transfer curve segment of the container handling segment BR.

Further advantageously, the transfer curve segment formed by the guide rails is formed between the first transporter 5 and the transfer at the container handling station BS as a clothoid segment and/or Bloss curve segment, the course of which is selected in the form of a clothoid or of a Bloss curve respectively.

The closing machine 1 further comprises, above the movement path of the containers 2, along the container handling segment BR, in particular at least above the transfer curve segment, at least one counter-pressing element 23, which presses against the closure cap 21, placed onto the container 2 by the closure cap delivery conveyor 20.

Preferably, in this situation two counter-pressing elements 23, arranged essentially parallel to one another, are provided on both sides above the movement path of the containers 2 along the container handling segment BR, in particular at least on both sides above the transfer curve segment, which press on opposing sides against the closure cap 21 placed onto the container 2 by the closure cap delivery conveyor 20.

In particular, the counter-pressing elements 23 are configured such as to press the respective closure cap 21 preferably at its free periphery regions, in order to keep free the middle of the closure cap 21 for the subsequent action/gripping of the punch device 6.

Preferably, the counter-pressing elements 23 are provided as counter-pressing strips, which form on their respective under sides, facing towards the closure cap 21, sliding surfaces with a particularly low friction coefficient.

The counter-pressing elements 23 can be arranged at the closing machine 1 in such a way that the counter-pressing elements 23 are formed as fixed in position, and therefore do not rotate or revolve with the closer and/or the can delivery conveyor or the delivery wheel. As an alternative, or also as an addition, the counter-pressing elements 23 are configured at least partially or also fully in such a way that the counter-pressing elements 23 move with the first transporter and/or rotate with the rotor 3.

Further advantageously, the counter-pressing elements 23 are configured such as to actively press/tension the respective closure cap 23 and the associated container 2 against one another already before the combination of "closure cap 21 and associated container 2" circulates jointly at the container handling station BS, in such a way that such a sealing position is achieved between the closing cap 21 and the container 2 that an overflow of the filling product at the acceleration of the containers 2 is avoided, completely or at least essentially.

Preferably, the counter-pressing of the closure cap 21 and the associated container 2 begins immediately after the closure cap 21 has been placed onto the container 2, and even more advantageously at a point of time at which the container 2, including the closure cap 21 placed on it, is located completely, with its container base 2.1, on the transporter 5, upstream of the corresponding container closing station BS, BS' in the handling direction. In other words, therefore, the closure cap 21 is placed onto the container 2, and at least partially pressed into place, still before the container 2 passes into the effect range of the container closing station BS, BS'.

In greater detail, provision can be made for the closure cap 21 to be placed onto the container 2 and pressed at least partially by means of the at least one counter-pressing element 23, before the respective container 2 is transferred with a maximum of 50%, and preferably less than 25%, of its container base surface 2.1 onto the respective container carrier 8 of a corresponding container closing station BS, BS'.

Preferably, the counter-pressing of closing cap 21 and container 2 is put into effect by the at least one counter-pressing element 23. The counter-pressing of closure cap 21 and container 2 is preferably maintained by means of the counter-pressing element 23 for as long as until, at a corresponding container handling station BS, an assigned punch device 6 is lowered onto the closure cap 21, and then the respective closure cap 21 is finally pressed together with the container 2.

The invention has been described heretofore by way of exemplary embodiments. It is understood that a large number of modifications or derivations are possible, without thereby departing from the scope of protection of the invention as defined by the claims. The contents of the claims are also declared to be the object of the description.

REFERENCE NUMBER LIST

1 Container-handling apparatus
2 Container

2.1 Container base
3 Rotor
4 Central column
5 First transporter
6 Punch device
7 Carrier ring
8 Container carrier
8.1 Contact surface
10 Transfer element
10.1 Securing arm
10.2 Surface
11 Raising cam
11.1 Outer circumference
12, 12' Running roller
20 Closing cap delivery conveyor
21 Closure cap
22 Transfer device
23 Counter-pressing element
24 Guide
A Handling direction
AD Outer diameter
BR Container handling segment
BS, BS' Container closing station
GE Common plane
TE Transport plane
OS Upper side
VA Closing element axis
ÜE Transfer plane

The invention claimed is:

1. A container-handling apparatus for closing containers with a closure cap, the apparatus comprising:

a first transporter being a linear conveyor, a fixed position central column extending along a vertical machine axis, and a rotor disposed circumferentially around said vertical machine axis and downstream of said first transporter in a conveying direction, said rotor being driven by a motor to circulate around said central column;

a plurality of container closing stations disposed at a circumference of said rotor for rotating around said central column, said container closing stations being configured for closing the containers with respective closure caps received from a closure cap delivery conveyor;

said first transporter being configured to convey the containers, not yet closed and standing upright with container bases on a transport plane, and to transfer the open containers to respective container closing stations of said rotor;

each of said container closing stations having at least one punch device, arranged at said rotor so as to be lowered and raised, and a container carrier disposed beneath said punch device;

a carrier ring, driven by a motor to circulate around said central column beneath said rotor, said container carrier being configured to carry out rotational movements and raising movements at said carrier ring; and at least one transfer element disposed between at least two adjacent container closing stations, at least partially enclosing a circumference of the respective container carrier, said transfer element being configured to rotate together with said container closing stations, and said transfer element having an upper side forming a transfer plane for a planar transfer of the containers standing upright from said transport plane onto said transfer plane spanned by said transfer element, with the transfer plane and the transport plane spanning a common plane.

2. The container-handling apparatus according to claim 1, wherein said at least one transfer element is configured to rotate in synchrony with said container closing stations.

3. The container-handling apparatus according to claim 1, wherein a transport surface, which at least at times is closed, is formed between said first transporter and said at least one transfer element, and configured to enable the container with the respective container base thereof to be steplessly transferred from said first transporter onto said at least one transfer element, and from said at least one transfer element onto said height-adjustable container carrier.

4. The container-handling apparatus according to claim 1, wherein said at least one transfer element is a transfer plate.

5. The container-handling apparatus according to claim 1, wherein said at least one transfer element is arranged securely but detachably at said carrier ring.

6. The container-handling apparatus according to claim 1, wherein said at least one transfer element has an upper side forming a planar surface, which spans the transfer plane, and exhibits a friction coefficient which is so low as to enable the respective container bases to be transferred sliding on said at least one transfer element.

7. The container-handling apparatus according to claim 1, wherein said at least one transfer element has surface edges at a free peripheral region of a surface formed with a chamfer over at least part of a circumference thereof.

8. The container-handling apparatus according to claim 1, wherein a transfer element is provided between at least two adjacent container closing stations, which encloses the respective container in a full circumference thereof in a region of a contact surface.

9. The container-handling apparatus according to claim 8, wherein said at least one transfer element is one of a plurality of transfer elements provided between all of said container closing stations.

10. The container-handling apparatus according to claim 1, further comprising guide rails forming a transfer curve segment between said first transporter and a transfer of the containers to the respective said container closing station, said transfer curve segment being formed as at least one of a clothoid segment or a Bloss curve segment having a course following a clothoid or a Bloss curve.

11. The container-handling apparatus according to claim 10, wherein said guide rails are configured to prevent a tipping of the containers during a transfer in the transfer curve segment.

12. The container-handling apparatus according to claim 10, further comprising at least one counter-pressing element above a movement path of the containers through the transfer curve segment, said at least one counter-pressing element being configured to press against the closure cap placed onto the container by the closure cap delivery conveyor.

13. The container-handling apparatus according to claim 12, wherein said at least one counter-pressing element is configured to press the respective closure cap at free peripheral regions thereof.

14. The container-handling apparatus according to claim 12, wherein said at least one counter-pressing element is a counter-pressing strip, which comprises slide surfaces on a respective under side facing towards the closure cap.

15. The container-handling apparatus according to claim 12, wherein said at least one counter-pressing element is arranged in a fixed position on the container-handling apparatus.

16. The container-handling apparatus according to claim 12, wherein said at least one counter-pressing element and/or a guide for guiding the containers are configured to prevent an unwanted tipping of the containers when the containers are raised with a raising plate of said container carrier.

17. The container-handling apparatus according to claim 12, wherein said at least one counter-pressing element and/or the guide are configured in such a way that the cans are transferred in a correct dividing arrangement and straight onto a raising plate, and wherein the guides are in clothoid form or are produced by way of polynomials.

18. The container-handling apparatus according to claim 1, wherein said closure cap delivery conveyor is configured to deliver the closure caps individually before the respective container is transferred to a respectively assigned said container closing station.

19. A method of closing containers with a closure caps, the method comprising:

providing a closing machine with a circulating design and producing respective containers having a positive-fit connection between the closure cap and the container by counter-pressing;

for a closing movement, raising the container by a container carrier and/or lowering a punch device onto the container together with the closure cap placed thereon; and placing the closure cap onto the container and at least partially pressing the closure cap into place before the container is transferred, with a respective container base thereof, completely onto a container closing station.

20. The method according to claim 19, which comprises pressing the closing cap at least partially by at least one counter-pressing element.

21. The method according to claim 19, which comprises at least partially pressing the closure cap onto the container before the respective container is transferred with a maximum of 50% of a container base surface thereof onto the respective container base of a corresponding container closing station.

22. The method according to claim 21, which comprises at least partially pressing the closure cap onto the container before the respective container is transferred with less than 25% of the container base surface thereof onto the respective container base of the corresponding container closing station.

23. The method according to claim 19, which comprises at least partially pressing the closure cap onto the container at a point in time at which the container, including the closure cap placed on it, is still completely located with the container base on a transporter arranged upstream of the corresponding container closing station in a handling direction.

24. The method according to claim 19, which comprises maintaining a counter-pressure between the closing cap and the container by way of the counter-pressing elements until an assigned punch device is lowered at a corresponding container handling station onto the closing cap, and then finally pressing the respective closure cap against the container.

* * * * *